United States Patent
Bobroff et al.

(10) Patent No.: US 7,823,152 B2
(45) Date of Patent: Oct. 26, 2010

(54) SYSTEM AND METHOD FOR COLLABORATIVE HOSTING OF APPLICATIONS, VIRTUAL MACHINES, AND DATA OBJECTS

(75) Inventors: Norman Bobroff, Katonah, NY (US); Andrzej Kochut, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/447,163

(22) Filed: Jun. 6, 2006

(65) Prior Publication Data

US 2007/0283347 A1 Dec. 6, 2007

(51) Int. Cl.
*G06F 9/455* (2006.01)

(52) U.S. Cl. .......................................... 718/1; 717/176
(58) Field of Classification Search ....................... None
See application file for complete search history.

(56) References Cited

U.S. PATENT DOCUMENTS

| | | | |
|---|---|---|---|
| 7,577,722 B1 * | 8/2009 | Khandekar et al. | 709/220 |
| 2007/0006205 A1 * | 1/2007 | Kennedy et al. | 717/168 |

* cited by examiner

*Primary Examiner*—Li B Zhen
(74) *Attorney, Agent, or Firm*—Whitham, Curtis, Christofferson & Cook, P.C; Stephen C. Kaufman

(57) ABSTRACT

To provide collaborative hosting of applications, the present invention first generates a virtual operating system image consisting of operating system code, application code, runtime code and supporting data repositories. The virtual operating system image may then be sent to and deploying on a physical computer or computer terminal at another location.

3 Claims, 6 Drawing Sheets

SYSTEM AND METHOD FOR COLLABORATIVE HOSTING OF APPLICATIONS, VIRTUAL MACHINES, AND DATA OBJECTS

BACKGROUND OF THE INVENTION

1. Field of the Invention

The present invention generally relates to the processing of data processing jobs in data centers.

2. Background Description

Customer applications, and other work or tasks requiring significant resources, are frequently developed at a customer site, even though customer sites may be resource limited environments. Subsequently, after development, the work may be submitted to a large data processing center for execution. Such work is sometimes referred to as "batch" work, but "batch" work may also refer to other large, distributed, or high-performance computing applications. Successful processing of the work in a large data center requires a runtime and hardware environment compatible with the development environment, regardless of whether the development was done at a customer site or at a site maintained by the data center. Submitted work developed at a customer site or other off-site facility may fail and require significant, and costly, debugging at the large data processing center.

The underlying cause of such failure is commonly the circumstance that the various components of the application (e.g., code, runtime libraries, data repositories) are individually deployed with the batch job, or may be substituted by similar—but not identical—resources in the processing center. For example, runtime libraries of the development environment may be substituted by runtime libraries of the data processing center which have subtle but consequential differences from those of the development environment.

A data center is a facility used for housing computers, communications equipment, and other hardware required to execute operating systems in virtual machines.

SUMMARY OF THE INVENTION

One solution is to bundle the application together with libraries and the entire operating system environment in a virtual machine. A virtual machine (VM) is a self-contained operating environment that behaves as if it is a separate computer. A VM executes on physical computer hardware which it may share with other VMs. Each VM runs in isolation as though it was a normal operating system on a physical computer. The VM is unaware that the hardware platform is shared with other VMs. Multiple operating systems may be simultaneously executed on a single computer with each operating system executing in a separate virtual machine. A virtual machine with its applications can be stopped at any time and its state saved to disk. A VM can be migrated to a different physical platform either while executing, or from its state save on disk.

Thus, the present invention provides for an application or business process development to occur within one or more virtual operating system (VOS) images at a customer site, or other off-site development environment. The virtual development environment image (including operating system code, application, runtime code, and supporting data repositories) may then be submitted to a large data processing center to enable the recreating of an application's development environment at the time of execution.

An alternative scheme may create initial virtual machines (VMs) via a service that creates operating system images close to what a customer requires. A standardized operating system image may be sent to a customer for additional customization, and then deployed to a physical machine at either the customer site or a hosting center site.

Migrating VM images offers advantages over the current methods of remote job submission. One significant advantage is that submitted "jobs" do not have to be aware of the environment in which they will run. This approach makes it possible to offer computing services that are independent of the details of the environment. Furthermore, the bundling of an entire operating system image ensures that the development and execution environments are identical. Distributed applications are easily submitted by shipping or transmitting the set of virtual images.

There are considerable advantages in managing an execution environment at a hosting site where multiple customers are hosted.

Virtual images provide improved flexibility in scheduling over applications. The scheduler can now work on virtual images in addition to individual tasks. A virtual image can be brought up on any physical machine, paused, saved to disk, or migrated to another physical platform in response to contention or increasing resource demands.

Submission of VOS images may be facilitated by using SAN mappings to map the storage from the remote site to the processing center. Hybrid forms of submission are also possible, such as the VOS image. The storage containing the database may be remapped using storage virtialization technology, rather than being moved over the network.

The present invention thus provides a method, a system, and a machine-readable medium providing computer instructions for collaborative hosting of applications, comprising the steps of: using a computer to generate a virtual operating system image, said virtual operating system image consisting of operating system code, application code, runtime code, and/or supporting data repositories; sending said virtual operating system image and deploying said image at a physical computer or computer terminal; and migrating said virtual machine between a hosting environment and said computer. The virtual operating system image may be sent via a network, and the network may be the Internet. The hosting environment may be a data center, and the migrating step may include movement back and forth between said hosting environment and said computer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
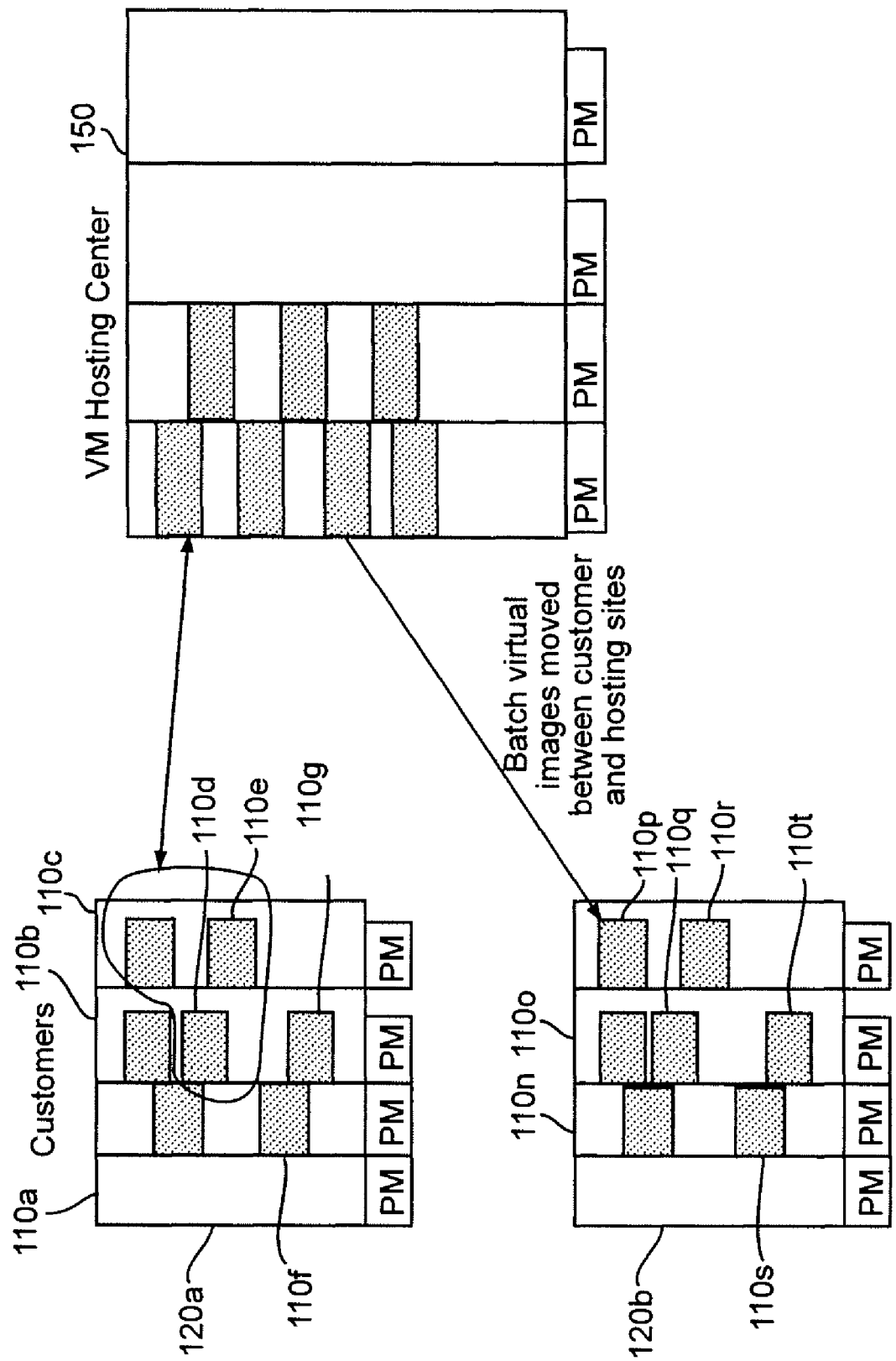
FIG. 1 shows a system for collaborative hosting of virtual machines and data objects according to the present invention.

Referring now to the drawings, and more particularly to FIG. 1, there is shown a system for collaborative hosting of virtual machines and data objects according to the present invention. The system might be used for testing and developing specialized applications for a customer. A VM at a customer site is migrated to a hosting environment when the customer is satisfied with its integrity. The VM may later be moved back to the customer for customization and development. When an application spans multiple VMs 110a, 110b, 110c, 110d, 110e, 110f, 110g, 110n, 110o, 110p, 110q, 110r, 110s, 110t, such as a three-tier web transaction system, an entire set of machines 120a, 120b which the application spans may be migrated to a hosting center 150. Details of co-hosting process are shown on following figures.

Figure 2:
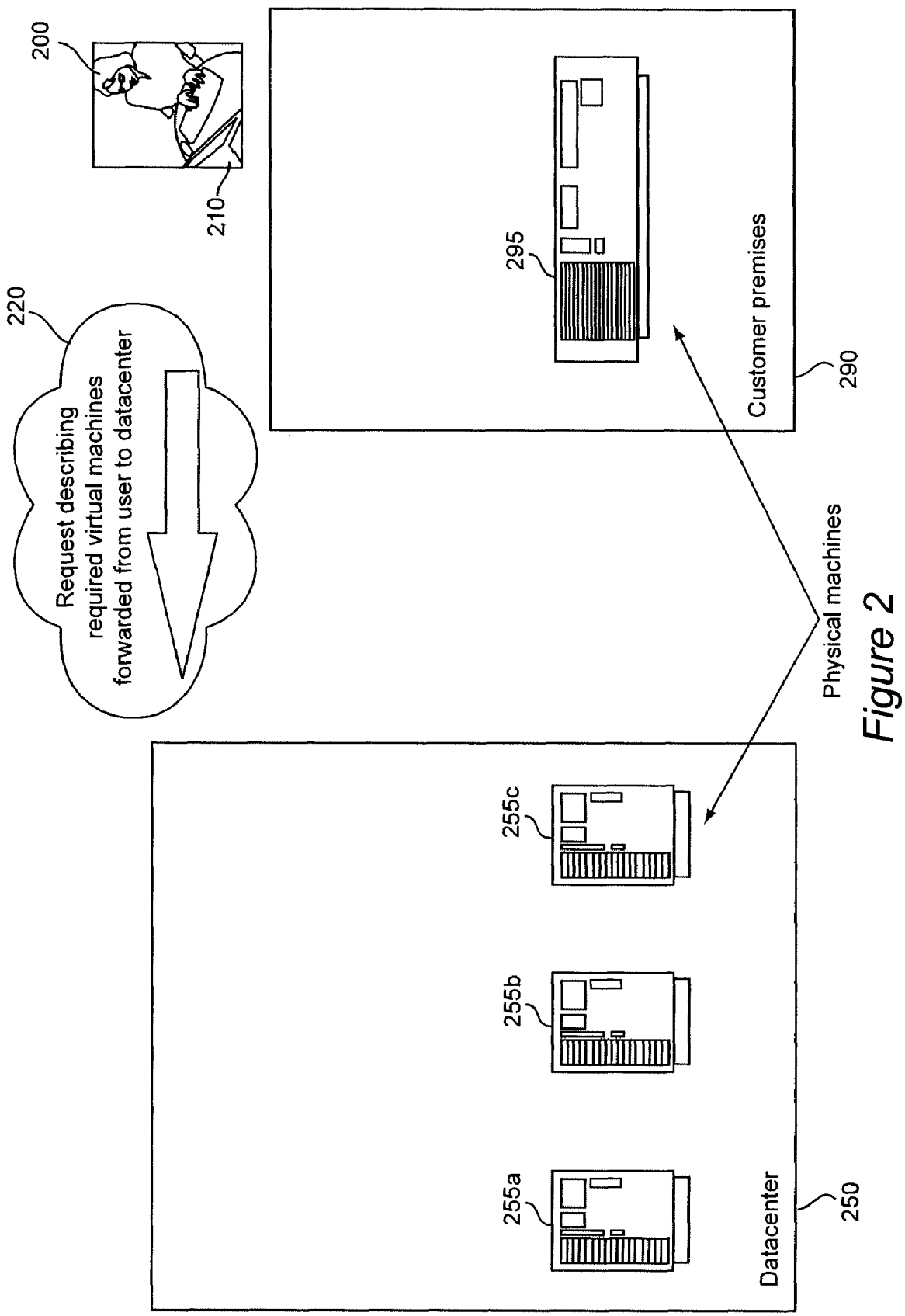
FIG. 2 shows a request for a set of virtual machines and applications.

Referring now to FIG. 2, there is shown a user 200 at a computer terminal 210 who is forwarding, via a network 220, a request to a data center 250 for virtual machines to be made available for use at a customer premises 290. The data center 250 includes physical machines in the form of servers 255a, 255b, 255c, and the customer premises 290 includes a physical machine in form of at least one workstation 295.

Figure 3:
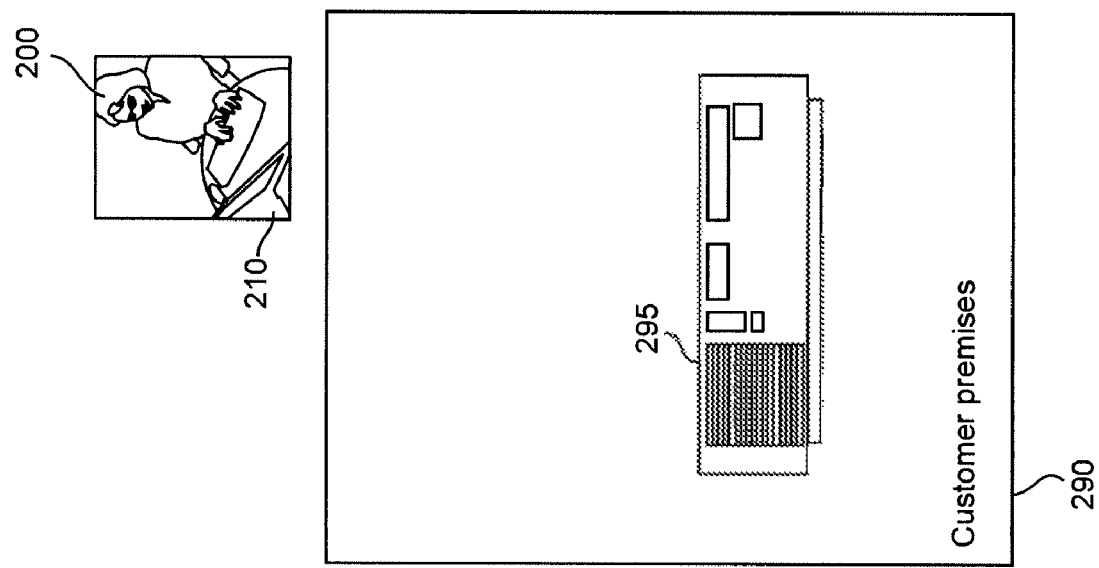
FIG. 3 shows data center creating virtual machines, deployed and tested at the datacenter.
Figure 3:
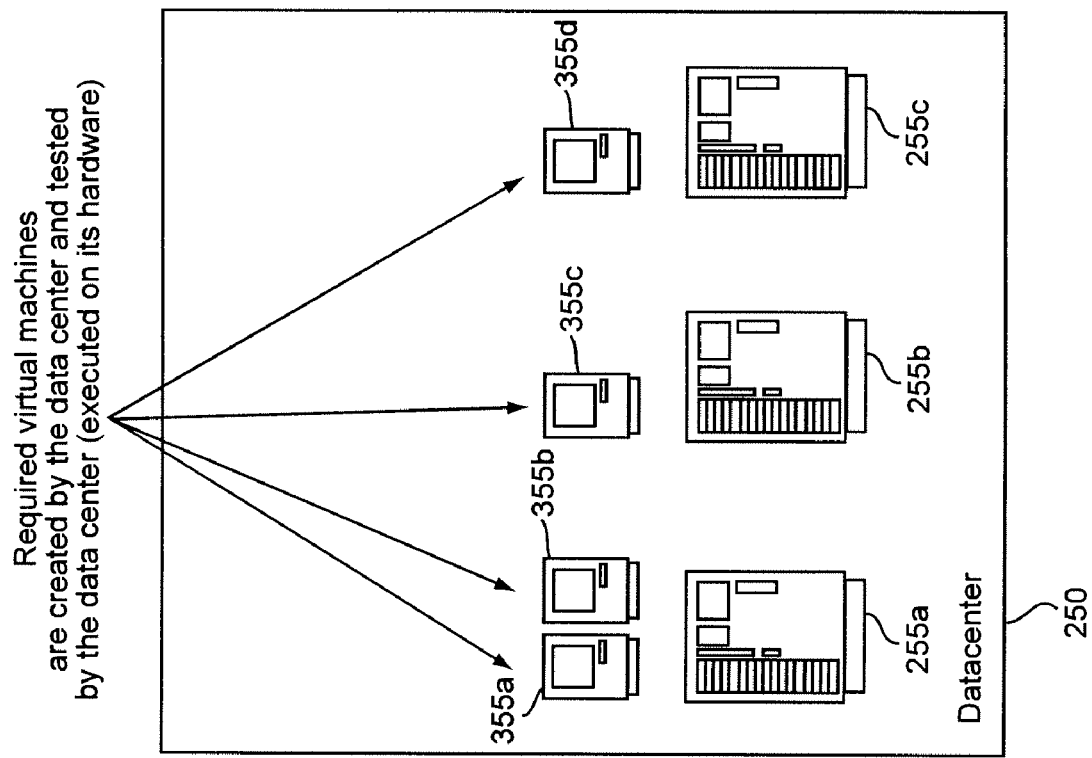

In FIG. 3, there is shown a datacenter 250, where required virtual machines 355a, 355b, 355c, 355d are created and tested by deploying them on the hardware 255a, 255b, 255c of the datacenter 250, and then executing and testing them.

Figure 4:
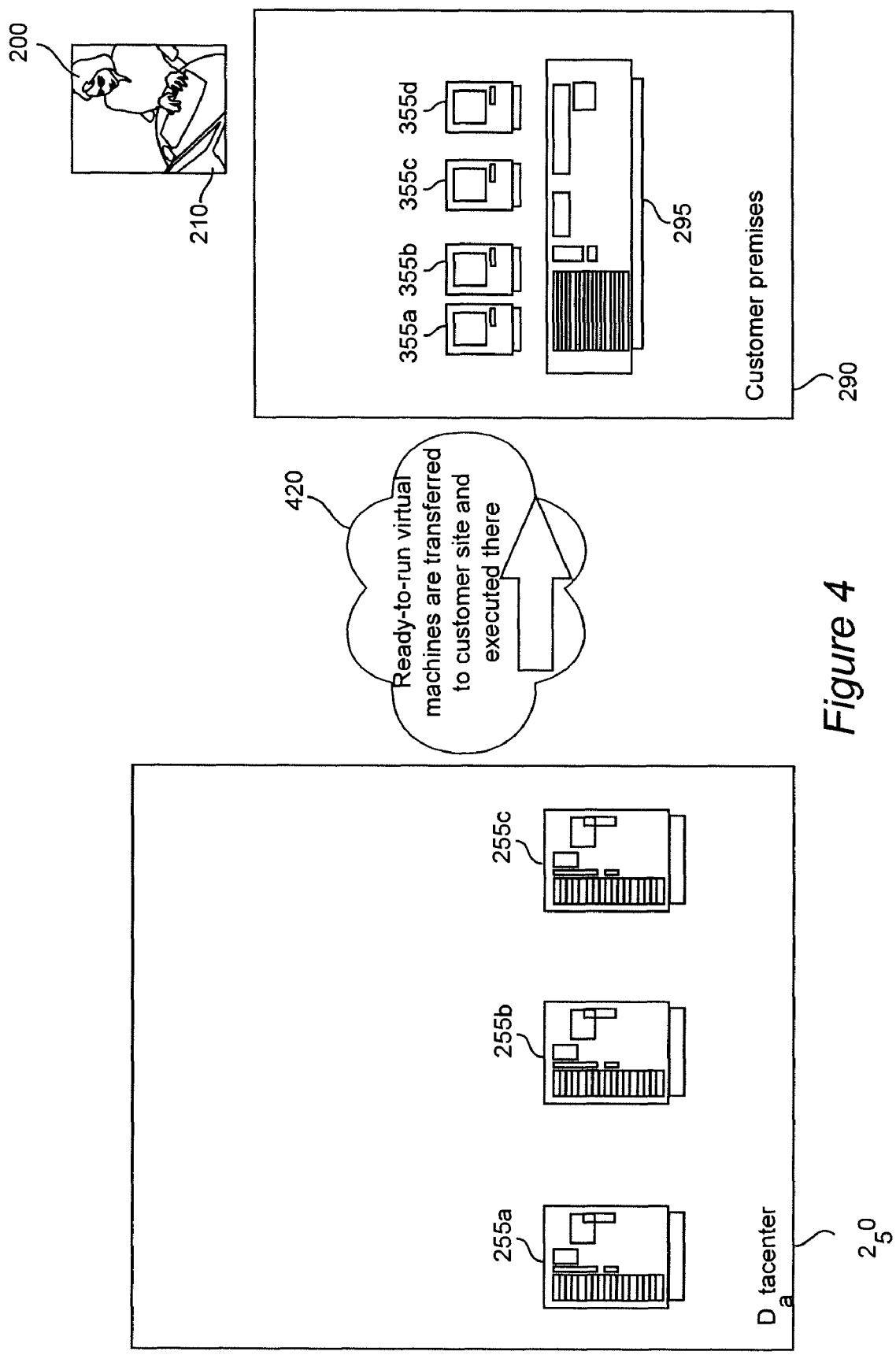
FIG. 4 shows virtual machines transferred to the customer site.

FIG. 4 shows ready-to-run virtual machines 355a, 355b, 355c, and 355d that have been transferred via a network 420 from a data center 250 to a customer premises 290, where the virtual machines are executed.

Figure 5:
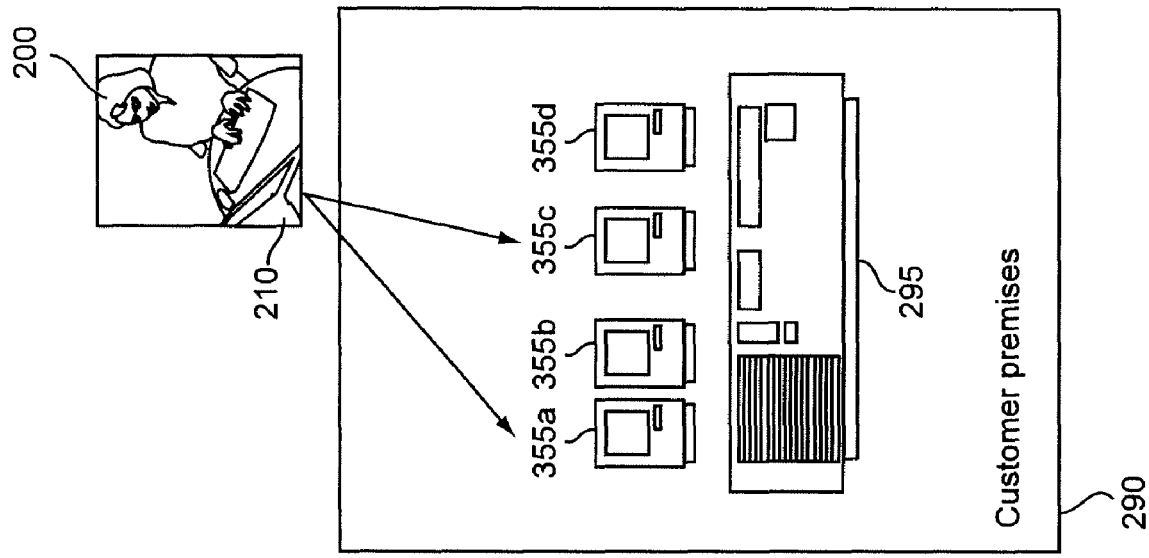
FIG. 5 shows customer customizing and executing virtual machines at customer site.
Figure 5:
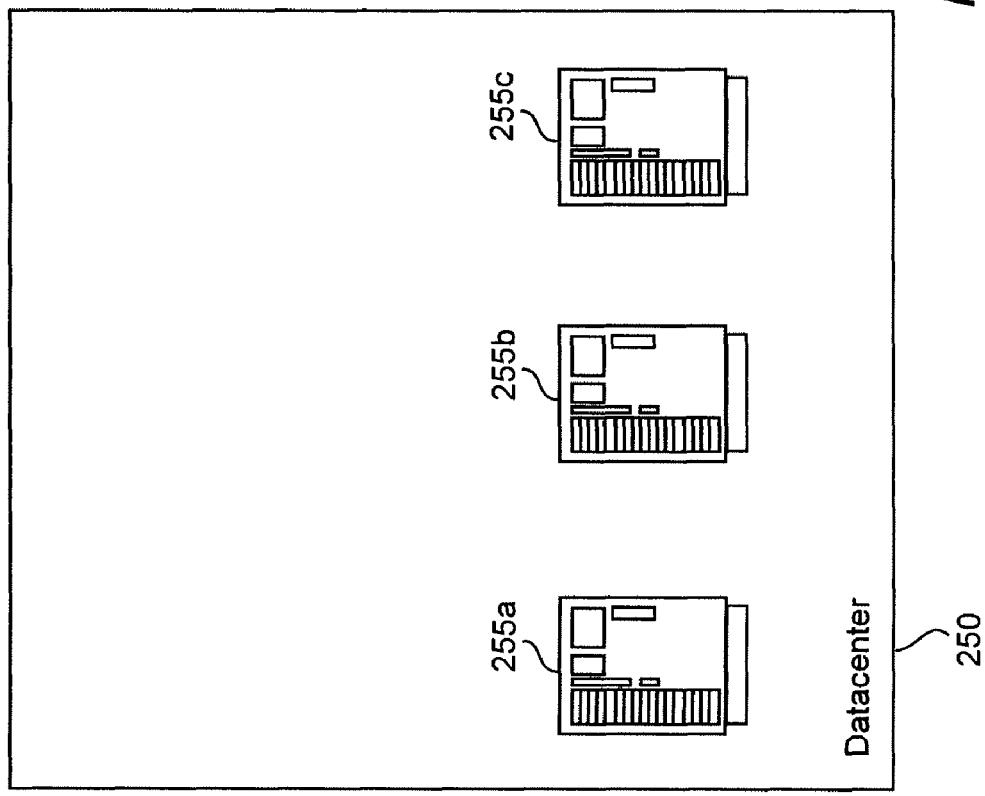

FIG. 5 shows a user 200 at a terminal 210 customizing virtual machines 355a, 355b, 355c, and 355d and executing them on a physical machine 295 at the customer premises 290.

Figure 6:
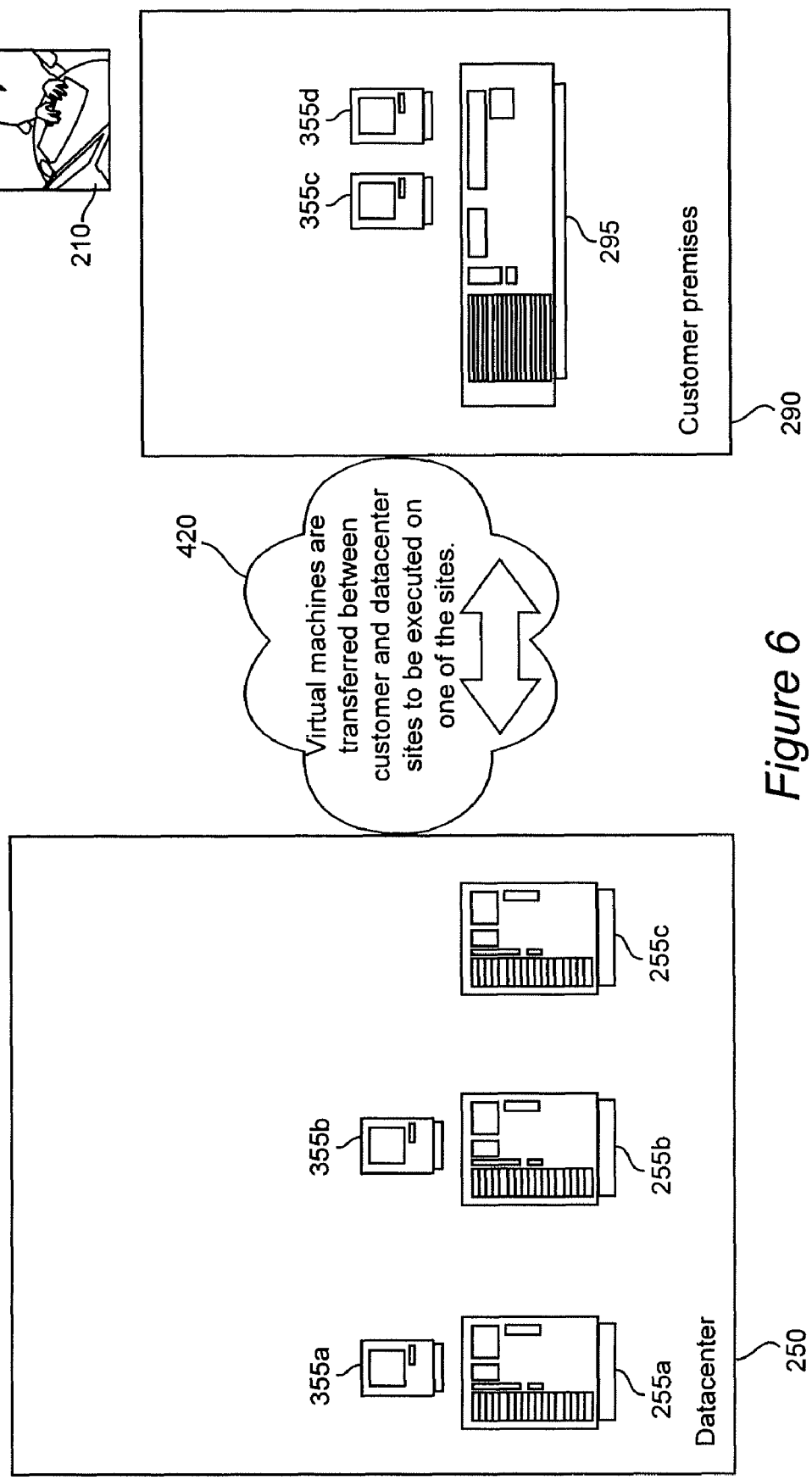
FIG. 6 shows virtual machines executed on customer and/or data center physical machines.

Finally, FIG. 6 shows virtual machines 355a, 355b, 355c, 355d which have been executed both on a customer's physical machine 295 and on datacenter physical machines 255a, 255b, 255c and then transferred via a network 420 between the customer premises 290 and datacenter 250 as needed.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for collaborative hosting of virtual machines, comprising:
   forwarding, by a user or customer, via a network to a data center which is a large data processing center a request that a set of virtual machines be made available for use at a customer premises which is a resource limited environment that includes at least one workstation which is a physical machine;
   at the data center, in response to the request, creating the set of virtual machines, wherein a virtual machine is a self-contained operating environment that behaves as a separate computer, and can be stopped at any time and a state of the stopped virtual machine saved to disk, and can be migrated to a different physical platform either while executing or from the state saved to disk;
   at the data center, which includes hardware including servers, deploying the set of created virtual machines on the hardware, then executing and testing the set of virtual machines on the hardware of the data center;
   via the network, transferring the set of virtual machines which are multiple ready-to-run virtual machines to the customer premises;
   customizing the set of virtual machines by the user at the customer site and executing by the user at the customer premises, the set of virtual machines;
   once the set of virtual machines have been executed on physical machines at the customer premises and at the data center, transferring the set of virtual machines via the network between the customer premises and the data center;
   including migrating a virtual machine within the set, when the customer is satisfied with its integrity, from the customer site to the data center, and later moving said migrated virtual machine back to the customer site for customization and development.

2. The method of claim 1, wherein the steps include migrating the set of virtual machines which is a three-tier web transaction system.

3. The method of claim 1, wherein the set of virtual machines is a set of four virtual machines and the step of transferring the set of virtual machines to the customer premises is that of transferring the set of four virtual machines from the data center to the customer premises where the four virtual machines are executed on a physical machine at the customer premises.

* * * * *